(12) United States Patent
Zhen

(10) Patent No.: US 7,545,535 B2
(45) Date of Patent: Jun. 9, 2009

(54) ROBUST AUTOMATIC PAGE SIZE DETECTION ALGORITHM FOR SCAN APPLICATION

(75) Inventor: He Zhen, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 559 days.

(21) Appl. No.: 11/312,425

(22) Filed: Dec. 21, 2005

(65) Prior Publication Data
US 2007/0146811 A1 Jun. 28, 2007

(51) Int. Cl.
*H04N 1/40* (2006.01)
(52) U.S. Cl. .................. 358/1.9; 358/449; 358/474
(58) Field of Classification Search ............... 358/1.2, 358/1.9, 449, 464, 474
See application file for complete search history.

(56) References Cited

U.S. PATENT DOCUMENTS

| 5,946,527 | A | 8/1999 | Salgado et al. |
| 6,266,512 | B1 | 7/2001 | De Koning et al. |
| 6,535,306 | B1* | 3/2003 | Kiuchi ................ 358/474 |
| 2004/0190072 | A1 | 9/2004 | Li et al. |
| 2005/0219649 | A1* | 10/2005 | Kim .................... 358/486 |

\* cited by examiner

*Primary Examiner*—Thomas D Lee
(74) *Attorney, Agent, or Firm*—Pillsbury Winthrop Shaw Pittman LLP

(57) ABSTRACT

The present invention discloses a method of automatically detecting a page size for a digital scanning operation. The method includes establishing vertical and horizontal limits of an image area containing image content features of a pre-scanned image, detecting vertical page edge information of the image area, and detecting horizontal page edge information of the image area, such that the vertical and horizontal page edge information define the page size for the pre-scanned image.

12 Claims, 5 Drawing Sheets

ROBUST AUTOMATIC PAGE SIZE DETECTION ALGORITHM FOR SCAN APPLICATION

BACKGROUND OF THE INVENTION

1. Field of Invention

The present disclosure relates to the digital scanning or recording of original images, as would be found, for example, in a scanner, digital copier, facsimile, or multifunction machine.

2. Description of Related Art

Digital scanning, or the recording of images from original documents as digital image data, has become prevalent in both office and home environments. Digital scanning is generally performed on equipment having scanning capabilities, such as a scanner, digital copier, facsimile, or multifunction machine. In the case of a scanner, for example, the original documents bearing content to be imaged as digital data, are loaded onto the scanner glass, which is sized to handle a variety of document sizes. To capture the image, the scanner employs a scanning imaging device, such as, for example, an image sensor that may include one or more linear arrays of photo-sensors. Each of the photo-sensors records the reflected light from a series of small areas in the original document as the photo-sensors move past the document, yielding a set of digital signals comprising intensity and tonal values for each pixel of the image.

During the scanning process, the scanner typically performs a pre-scan operation that captures a reduced, resolution image of the original document, at the full scanner capacity size, to produce a preview image. As depicted in FIG. 1A, the reduced resolution preview image 110 includes a portion representing the contents of the original document 112 as well as a horizontal portion 114$j$ and vertical portion 114$i$ that represents the imaged white platen areas scanner back-cover (i.e., scanner capacity size).

The preview image 110 is processed with an automatic page size detection algorithm to determine a document page size. The resulting page size is then used to control the scanner as it performs a full resolution scan of the original document.

As a practical matter, the scanning of original images involves certain considerations to provide a satisfactory result. One set of considerations involves taking into account the size of the original documents being scanned. For scanning applications, it is desirable that the scanner automatically determine the size of the original document, so that it only captures the desired image of the original document, while excluding the rest of white platen back-cover area of the scanner.

With this said, it is to be noted that conventional automatic page size detection algorithms are only based on very localized page edge detection schemes that operate on the content of the reduced resolution pre-scan image to locate a page edge as opposed to detecting the actual page edge. For example, to find the right page edge under such schemes, a local edge detection operator is applied at each row to locate the most-right edge based on the imaged content of the document. After finding the most-right edge of each row, the algorithm tracks the edge points with some edge point local continuity condition from top to bottom. And the location of the survived most-right edge point at the end will be used to compute the page width. The final image is then cropped out from the whole image, based on the computed image size.

There are two drawbacks to this approach. First, the approach is vulnerable to scanner noise caused by dirt on the scanner glass between scanner imaging device, such as the image sensor, and the original documents. It is fairly common to have some small dust particles or short paper fiber residue on the scanner glass and, although such particles and/or residue maybe appear small to the naked eye, it can easily extend more than a couple of pixels at common pre-scan resolution (e.g., 150 dpi). This may mislead local edge point detection and tracking algorithms. The page edge itself, which is formed at the boundary between page white and platen back-cover, which is white for most cases, is a "weak" edge. If stronger edge detection conditions are applied to avoid dots or short thin line caused by the dirt on the glass, which usually has the same order to even greater edge strength compared to the page edge, it may also miss more locations of the true page edge point of each row. In contrast, if one applies weaker edge detection condition, then the tracking algorithm becomes more susceptible to artificial edges formed by the dirt.

Second, if the original document size reaches the full width of the scanner capability, there may be no page edge at the right. In this case, the conventional algorithms will not be able to detect the paper width correctly. For a typical document, such algorithms usually set the page width at the last strong and continuous edge inside the image contents of the original document, which may exclude some portions of the original image contents.

SUMMARY OF THE INVENTION

Principles of the present invention, as embodied and broadly described herein, provide for a method for automatically detecting a page size for a digital scanning operation. In one embodiment, the method comprises establishing vertical and horizontal limits of an image area containing image content features of a pre-scanned image by analyzing edge and gray level attributes of the pre-scanned image, detecting vertical page edge information of the image area, and detecting horizontal page edge information of the image area, such that the vertical and horizontal page edge information define the page size for the pre-scanned image.

The method may further comprise apportioning the pre-scanned image into a plurality of localized areas, detecting edge and gray level attributes for each localized area, and qualifying the detected edge and/or gray level attributes to generate an image area.

The method may also comprise filtering the image area along a horizontal direction to produce a smoothed image area, detecting horizontal edges in the smoothed image area to generate a horizontal edge point map dividing the horizontal edge point map into overlapping horizontal bands; and determining whether the edge points in the bands exceed a threshold, wherein the vertical page edge information is set to the first band from the bottom that exceeds the threshold and the vertical page edge information is set to the vertical limit of the image area when no band exceeds the threshold. In addition, the method further includes detecting whether the page is a full width page and setting a full width flag to circumvent the horizontal page edge information detection.

Moreover, the method may additionally comprise filtering the image area along a vertical direction to produce a smoothed image area, detecting vertical edges in the smoothed image area to generate a vertical edge point map, dividing the vertical edge point map into overlapping vertical bands; and determining whether the edge points in the bands exceed a threshold, wherein the horizontal page edge information is set to the first band from the right that exceeds the threshold and the horizontal page edge information is set to the horizontal limit of the image area when no band exceeds the threshold.

BRIEF DESCRIPTION OF DRAWINGS

The accompanying drawings, which are incorporated in and constitute a part of the present patent specification, depict corresponding embodiments of the invention, by way of example only, and it should be appreciated that corresponding reference symbols indicate corresponding parts. In the drawings.

DETAILED DESCRIPTION OF THE INVENTION

Figure 1A:
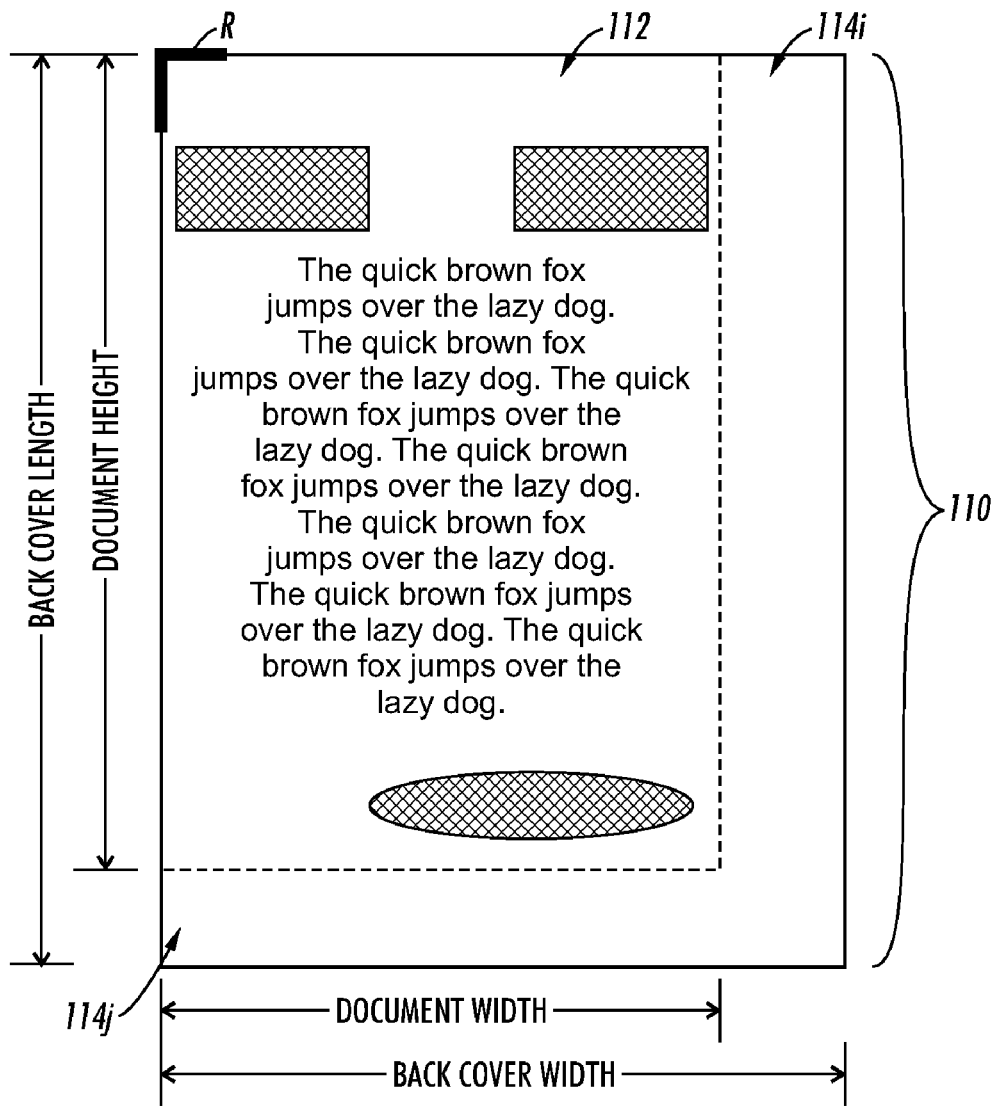
FIG. 1A illustrates a typical reduced-resolution, preview image of a pre-scanned document.

As will be evident by the ensuing detailed description, the present invention provides a method for automatically detecting a page size for a scan operation. For the sake of tractability, it is assumed that the scanner reference point R, as indicated in FIG. 1A, is at the top left corner of the scanner glass and that the original document is aligned against scanner reference point R. It is also assumed that the color of the scanner platen back-cover is white. It will be appreciated that these assumptions do not, in any way, limit the functionality of the present invention.

Figure 1B:
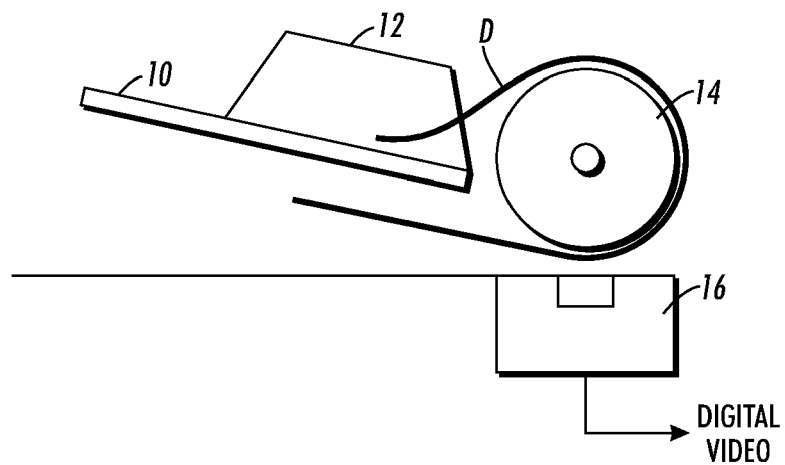
FIG. 1B illustrates elements of a digital input scanner.

FIG. 1B is a simplified diagram of elements of a digital input scanner, as would be found in a digital copier, scanner, or multifunction machine. An image-bearing document D, perhaps as part of a larger stack of documents, on a tray 10, which may also include a movable side guide 12. The document D is drawn from the stack or the tray and caused to move past a photosensor array 16 via a backing bar or roller 14. The photosensor array 16 includes one or more linear arrays of photosensors, which record reflected light from each of a series of small areas on document D as the sheet moves past the photosensors, yielding a set of digital signals comprising intensity and tonal values for each pixel of the image, which is output as a digital video stream. It will be appreciated that in other embodiments, document D may be held stationary and the photosensor array 16 may be caused to move past the documents via actuators, or other moving mechanisms suitable for such purposes, in order to generate the digital video stream.

The digital video stream may then be forwarded to, and stored in, a predetermined memory area, such as, for example, a random access memory (RAM), associated with the scanner. It will be appreciated that the predetermined memory area as well as other elements, such as read-only memory (ROM), buffer memories, and interfaces to various scanner functions may communicate with a processor or controller via a bus infrastructure. It will also be appreciated that the memories may also store processor executable code to process the digital video stream data.

Figure 2A:
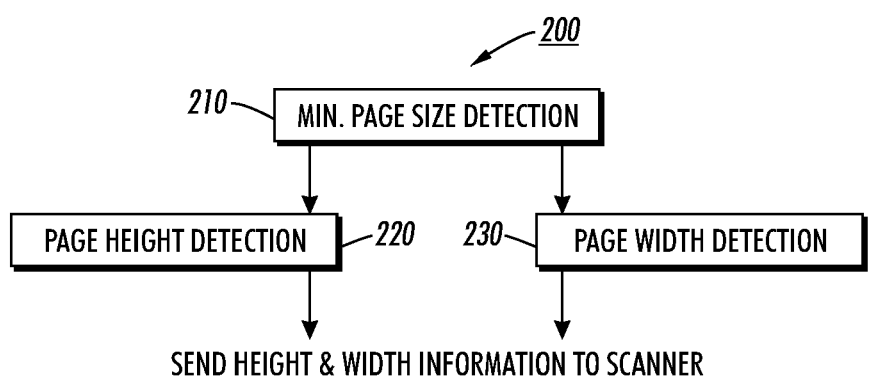
FIG. 2A depicts a flowchart representing an automatic page size detection process, in accordance with an embodiment of the present invention.

As discussed above, the scanner performs a pre-scan operation that captures a reduced resolution image of the original document, at the full scanner capacity size, to produce a preview image, as depicted in FIG. 1A. To this end, FIG. 2A illustrates a high-level flowchart of process 200, configured to automatically detect an original document page size after a pre-scan operation, in accordance with an embodiment of the present invention. As indicated in FIG. 2A, module 210 is the minimum page size detection module and is designed to compute the minimum page size limit. This information is then utilized by page height detection module 220 and page width detection module 230 to determine the actual horizontal and vertical edges of the original document, which should be used during the full resolution scan operation of the original document.

Minimum page size detection module 210 is configured to detect the contents and features of the original document and ensure that such features are included in the full-resolution scanning operation. The area inside the minimum page size limit will be excluded in the following page height and width detection, except for a few columns and rows just inside it. This conservative page size detection step can reduce the mistake that might be made in the follow detection steps. Minimum page size detection module 210 may also be configured to generate a threshold of edge point counts for the page height and width detection modules 220, 230, respectively.

Figure 2B:
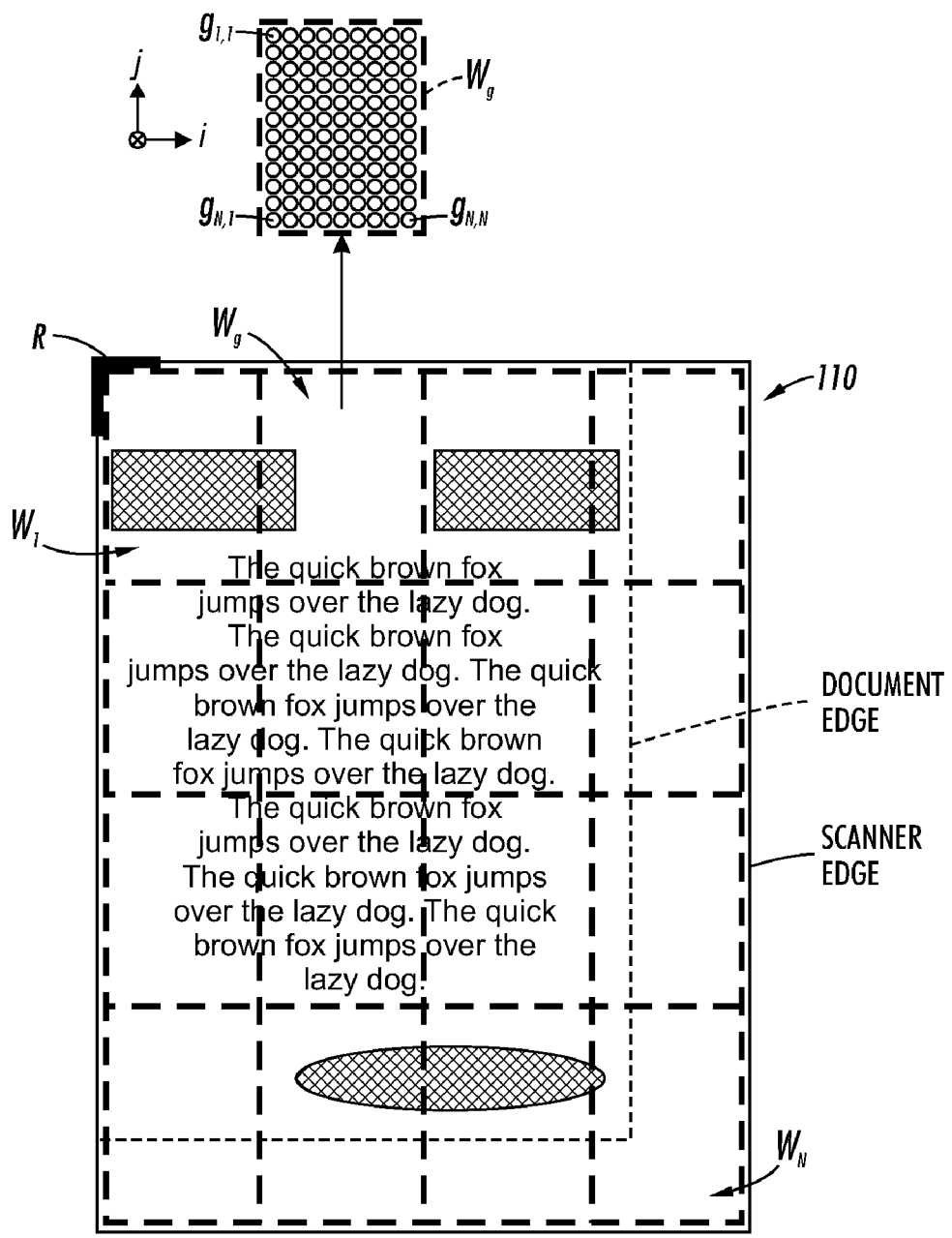
FIG. 2B illustrates certain parameters employed by the process depicted in FIG. 2B.
Figure 2C:
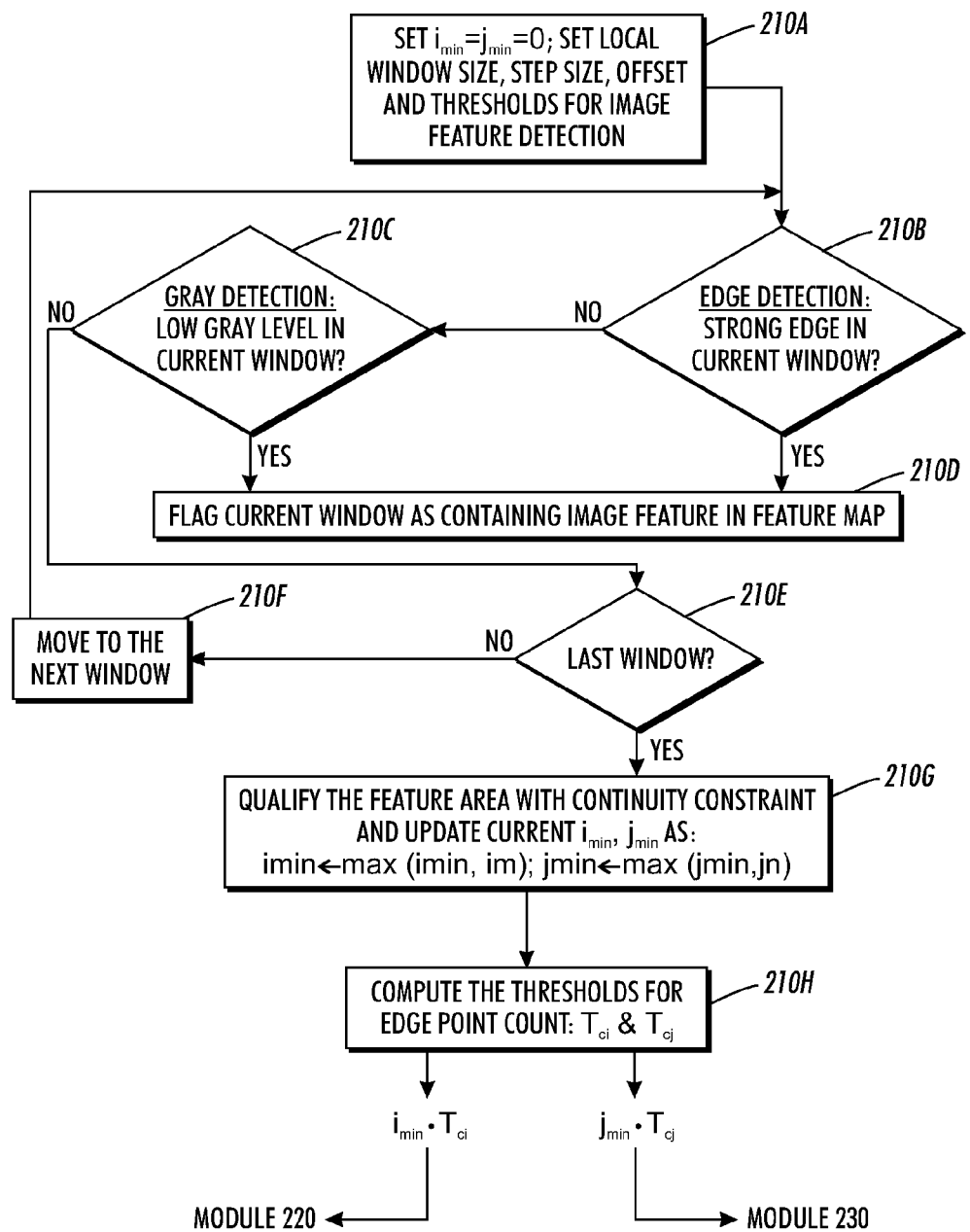
FIG. 2C illustrates a flowchart representing the operation of minimum page size detection module, in accordance with an embodiment of the present invention.

FIG. 2C illustrates the operation of minimum page size detection module 210, in accordance with an embodiment of the present invention. Module 210 is configured to operate on apportioned areas of the scanner size, referred heretofore as local windows $W_g$, and certain parameters associated with local windows $W_g$, as indicated in FIG. 2B. In the embodiment shown in FIG. 2B, local windows $W_g$ are juxtaposed, however it will be appreciated that local windows $W_g$ may be configured to overlap, without departing from the functionality of the present invention.

Returning to FIG. 2C, in task 210A, module 210 first sets the size of local window $W_g$, initializes the vertical and horizontal pixels $i_{min}$, $j_{min}$, within local window $W_g$, as well as the window moving step sizes, which correspond to the subsequent local window to be analyzed in both horizontal and vertical directions. To balance detection accuracy and scanner noise immunity vs. computational speed performance, the size of local window $W_g$ should be set large enough to only capture certain key image features. For example, a local window $W_g$ size of 9×9 pixels has been shown to provide accurate resolution and noise immunity without compromising computational speed.

As indicated in FIG. 2C, within the current local window $W_g$, module 210 applies a edge detection scheme 210B and a gray detection scheme 210C in order to detect image content features or attributes contained within current local window $W_g$. As will be described in greater detail below, edge detection 210B operates to identify strong horizontal and vertical edges within current local window $W_g$ while gray detection 210C operates to identify darker areas within current local window $W_g$ that are not likely to be background white or page white.

Upon edge detection scheme 210B determining that current local window $W_g$ contains a strong edge, module 210 flags the current local window $W_g$ as an image feature, as indicated by task 210D. Similarly, upon gray detection scheme 210C determining that current local window $W_g$ contains a low gray level, module 210 flags the current local window $W_g$ as an image feature, as indicated by task 210D. These flagged image features represent candidate image features that might need to be included in the minimum page size limit and are, therefore, captured into a feature map.

In particular, assuming, as indicated in FIG. 2B, that the pixel values inside current local window $W_g$ are $\{g_{ij}: i=1, 2, \ldots, N, j=1, 2, \ldots, N\}$. The horizontal, vertical, and total pixel sums are defined as follows:

$$S_{h_i} = \sum_{j=1}^{N} g_{i,j}$$

$$S_{v_j} = \sum_{i=1}^{N} g_{i,j}$$

$$S_t = \sum_{j=1}^{N} S_{v_j}$$

For the current local window $W_g$, the difference $\Delta S_h$ between the highest and lowest detected horizontal edge values and the difference $\Delta S_v$ between the highest and lowest detected vertical edge values are computed, as indicated below. Subsequently, the current local window $W_g$ area, $F_{m,n}$, is set to 1 in the feature map, as noted below:

$$\Delta S_h = \max(S_{h_i}) - \min(S_{h_i})$$

$$\Delta S_v = \max(S_{v_j}) - \min(S_{v_j})$$

$$F_{m,n} = \begin{cases} 1 & \text{if } ((\Delta S_h > T_h) \text{ OR } (\Delta S_v > T_v) \text{ OR } (S_t < T_t)) \\ 0 & \text{else} \end{cases}$$

where a value 0 corresponds to the color black, a value 255 corresponds to the color white, $T_h$ corresponds to a horizontal edge detection threshold, $T_v$ corresponds to a vertical edge detection threshold, and $T_t$ corresponds to a gray detection threshold. Thus, if the largest difference in horizontal edge values $\Delta S_h$ is greater than threshold value $T_h$ or the largest difference in vertical edge values $\Delta S_v$ is greater than threshold value $T_v$, as indicated by task 210B, module 210 flags the current local window $W_g$ in the feature map, as shown at task 210D.

Similarly, if the total sum of all pixel values $S_t$ is less than $T_t$, as shown at task 210C, module 210 also flags the current local window $W_g$ in the feature map, as shown at task 210D. Typically, $T_h$, and $T_v$, are set to large values and $T_t$ is set well below the typical white background value. In this manner, only strong image features will qualify the condition.

The size of the feature map is $\lfloor H/N \rfloor$ by $\lfloor W/N \rfloor$, where H and W denote the height and width of the pre-scanned image. The elements in the feature map marked with 1 are candidate image features that might need to be included in the minimum page size limit.

Module 210 then determines, as indicated at task 210E, whether the current local window $W_g$ is the last local window, and if not, module 210 moves to the next local window $W_{g+1}$, where it applies edge detection scheme 210B and a gray detection scheme 210C to local window $W_{g+1}$.

In order to improve the robustness in scanning artifacts and provide further immunity against scanner noise, if the current local window $W_g$ is the last local window, which means that the feature map generation is complete, module 210 performs an image feature qualification operation on the feature map, as indicated by task 210G. That is, a flagged element in the feature map will qualify as an image feature if the following continuity constraint is met:

$$F_{m,n} = 1 \text{ and } \bigvee_{p,q=-1,0,1;(p,q)\neq(0,0)} F_{m+p,n+q} = 1,$$

where '$\vee$' represents the logic OR function. In other words, a flagged element in the feature map is qualified as an image feature if at least one of its adjacent local windows also includes a qualified image feature. It will be appreciated that other continuity constraints may be used to qualify an image feature.

If the above condition is met, the row and column values of the minimum page size limit $(i_{min}, j_{min})$ will be updated to:

$$i_{min} = \max(i_{min}, i_m),$$

$$j_{min} = \max(j_{min}, j_n)$$

where $(i_m, j_n)$ is the bottom-right pixel location in the pre-scanned image of the latest qualified image feature area. The process continues until every flagged element in the feature map is checked. The resulting $(i_{min}, j_{min})$ is the desired minimum page size. In other words, the image area $I(i,j)$, where $i<i_{min}$ and $j<j_{min}$, contains qualified image content features of the original document that are to be included in a portion of the final page size. The thresholds of edge point count are then computed at task 210H, which will be detailed below.

As discussed above, once the minimum page size limit has been calculated, process 200 utilizes this information, as shown in FIG. 2A, to determine the actual vertical and horizontal page edges of the original document through page height and width detection modules 220, 230, respectively. Because page width detection module 230 operates in a similar fashion to page height detection module 220, for the sake of brevity, the following description focuses on the attributes and operation of page height detection module 220.

Figure 2D:
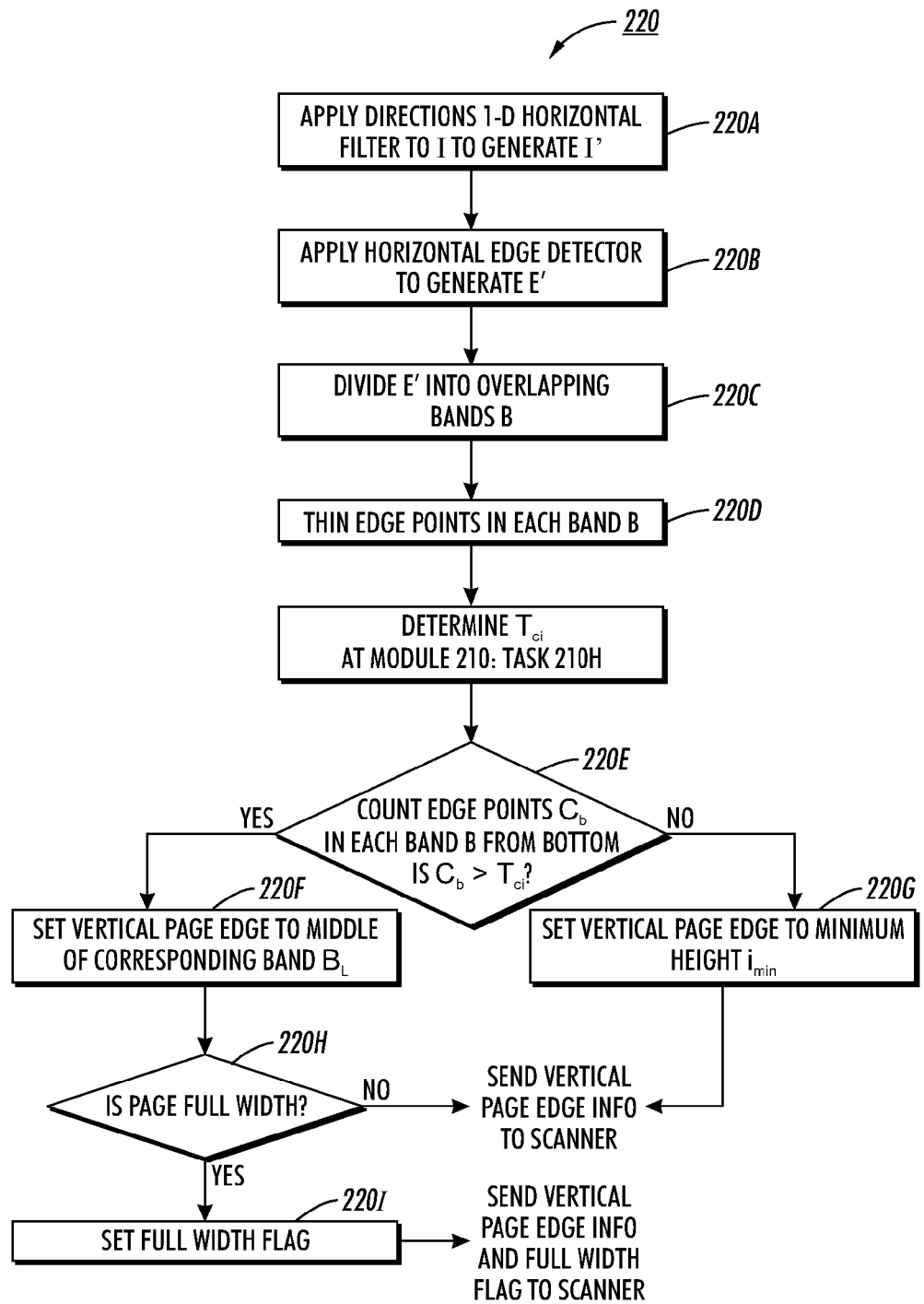
FIG. 2D illustrates a flowchart representing the operation of page height detection module, in accordance with an embodiment of the present invention.

FIG. 2D illustrates the operation of page height detection module 220, in accordance with an embodiment of the present invention. The detection occurs from the from the safe edge of the platen back cover boundary towards the minimum page size limit. In other words, the portion of the image area produced by module 210 that is used in height detection is:

$$I(i,j), \text{ where } i_{min} - N < i < H \text{ and } 0 < j < W.$$

The lower bound of the row is set for the case that there is little white margin in original document.

As indicated in FIG. 2D, at task 220A, module 220 applies a one-dimensional, horizontal filter to image area $I(i,j)$ in order to smooth the noise and avoid the possible blur of a weak page edge in the pre-scan, reduced resolution image. The filter length may be set to a pre-specified integer value L, where L adjacent horizontal pixels are averaged and the L pixels are replaced with the averaging pixel value, in which no overlapping is applied. In an exemplary implementation, L set it to 10 so that the image width along the horizontal direction is decimated to one tenth as compared to the original pre-scan image. The application of the one-dimensional filter generates a smoothed image I'.

At task 220B, a horizontal edge detector is applied to the smoothed image I' to obtain an edge point map $E(i,j)$. If $|I'(i,j)-I'(i+K,j)|>T_e$, then the edge point map $E(i,j)=1$. Otherwise, $E(i,j)=0$. K represents the distance between the two rows used in the detection (e.g., a couple of lines) and $T_e$ represents the preset edge threshold. Usually, $T_e$ value is small, since page edges are typically weak due to having a white page against white platen back-cover. In an exemplary implementation, $T_e$ was set it to 9.0, which adequately detected most of the page edge points, while limiting the number of the false edge points caused by the scan artifacts and noise.

After the edge point map E(i,j) is obtained, the map is divided into small horizontal, overlapped bands $B_k$ of pixel lines at task 220C. Each band $B_k$ consists of certain number of adjacent rows of the edge point map E(i,j). The formation of banding makes module 220 more robust when the pre-scan image contains a little skew, which is normal in practice, as well as ensuring the robustness of the page edge detection. In an exemplary implementation, each band $B_k$ included 12 rows and the adjacent band overlapped by 4 rows.

At task 220D, the edge points within each band $B_k$ are thinned. The assumption here is that, given a column j with m rows (m>1) within band $B_k$, there is at least one edge point within each band $B_k$ and once the first edge point is identified, the other edge points are ignored. The thinning process eliminates repetitive counting of edge points cased by thick edges, which reduces the false alarm of the detection.

After the thinning process, the number of the edge points $C_b$ within each band $B_k$ are counted and a determination is made as to whether an edge point $C_b$ exceeds a threshold $T_{ci}$, at task 220E. In one embodiment, the comparison is performed from the bottom of the page towards the top of the page. The threshold $T_{ci}$ (as well as $T_{cj}$ for the page width detection module 230) is calculated by task 210H of minimum page size detection module 210. Threshold $T_{ci}$ is computed as follows:

$$T_{ci} = \max(T_{c_{min}}, \alpha \cdot j_{min}),$$

where $\alpha$ is a fractional factor, typically around 0.5 and $T_{c_{min}}$ is the minimum constraint put on $T_{ci}$ and helps to increase the robustness when detecting small original documents (e.g., small name cards, etc.) The $T_{c_{min}}$ value is related to the minimum detectable page size limit requirement, the noisiness of the pre-scan image, and the detection threshold, etc.

During the comparison process, the first band $B_k$ from the bottom that contains edge point $C_b$ that exceeds $T_{ci}$, is designated as the location band $B_L$ of the page edge.

As indicated at task 220F, after module 220 identifies location band $B_L$, the vertical page edge is set to the middle of location band $B_L$ and module 220 proceeds to task 220H. If no band qualifies for the condition, module 220 proceeds to task 220G, where the vertical page edge will be designated to correspond to the minimum height $i_{min}$ computed in the minimum page size detection module 210 and, at task 220J, the vertical page edge information is subsequently sent to the scanner.

Once the vertical page edge is set, module 220 determines whether the page is full width (i.e., spanning the entire width capacity of the scanner), at task 220H. This is because, in many instances, the right edges for full width pages are not detectable. Module 220 performs the full width determination by counting the edge points of the P right-most columns within location band $B_L$ and applying a thinning processing, similar to the thinning process of task 220D. If the thinned edge point count exceeds a pre-set threshold $T_P$, module 220 determines that the page is a full width page and turns on a full width flag. In an exemplary implementation, P was set to 20 and $T_P$ was set to 12. If module 220 determines that the page is not a full width page, the vertical page edge information of band $B_L$ is sent to scanner. However, if module 220 determines that the page is a full width page, the full width flag along with the vertical page edge information of band $B_L$ is sent to scanner.

As noted above, the page width detection module 230 supplies horizontal page edge information to the scanner and operates in similar fashion to module 220, so that the details of module 230 are not repeated. Suffice to say module 230 that applies a one-dimensional, vertical filter to image area I(i,j) to smooth the noise and the filter length may be set to a pre-specified integer value V, where V adjacent vertical pixels are averaged and replaced with the averaging pixel value, in which no overlapping is applied. A vertical edge detector is applied to the smoothed image I' to obtain an edge point map E(i,j) and the map is divided into small vertical, overlapped bands $B_v$, of pixel lines, which are thinned. Module 230 then counts the number of the edge points $C_c$ within each band $B_v$, and determines whether an edge point $C_c$ exceeds a threshold $T_{cj}$, and if so, the horizontal page edge is set to the middle of location band exceeding the threshold $T_{cj}$. If no band exceeds the threshold $T_{cj}$, the horizontal page edge is set to correspond to the minimum width $j_{min}$ computed by the minimum page size detection module 210.

It is to be noted that page width detection module 230 may be skipped if the full-width tag is turned on by page height detection module 220, thereby saving computation time. Alternatively, the full-width tag may be ignored and symmetric page width detection may be performed.

In this manner, the identified minimum page size limit and the detected horizontal and vertical page edges operate to automatically detect the original document page size. This information is then supplied to the scanner, which employs the information during the full resolution scan operation of the original document to automatically render the correct page size.

While specific embodiments of the invention have been described above, it will be appreciated that the invention may be practiced otherwise than as described. As such, the description is not intended to limit the invention. The configuration, operation, and behavior of the present invention has been described with the understanding that modifications and variations of the embodiments are possible, given the level of detail present herein. Thus, the preceding detailed description is not meant or intended to, in any way, limit the invention—rather the scope of the invention is defined by the appended claims.

What is claimed is:

1. A method of automatically detecting a page size for a digital scanning operation, the method comprising:
    establishing vertical and horizontal limits of an image area containing image content features of a pre-scanned image by analyzing edge and gray level attributes of the pre-scanned image, wherein establishing of the image area limits comprises:
        apportioning the pre-scanned image into a plurality of overlapping localized areas,
        detecting edge and gray level attributes for each overlapping localized area, and
        qualifying the detected edge and/or gray level attributes to generate the image area;
    detecting vertical page edge information of the image area; and
    detecting horizontal page edge information of the image area,
    wherein the vertical and horizontal page edge information define the page size for the pre-scanned image.

2. The method of claim 1, wherein the horizontal page edge information detection comprises:
  filtering the image area along a vertical direction to produce a smoothed image area,
  detecting vertical edges in the smoothed image area to generate a vertical edge point map,
  dividing the vertical edge point map into overlapping vertical bands; and
  determining whether the edge points in the bands exceed a threshold,
  wherein the horizontal page edge information is set to the first band from the right that exceeds the threshold and the horizontal page edge information is set to the horizontal limit of the image area when no band exceeds the threshold.

3. A method of automatically detecting a page size for a digital scanning operation, the method comprising:
  establishing vertical and horizontal limits of an image area containing image content features of a pre-scanned image by analyzing edge and gray level attributes of the pre-scanned image, wherein establishing of the image area limits comprises:
    apportioning the pre-scanned image into a plurality of localized areas,
    detecting edge and gray level attributes for each localized area, and
    qualifying the detected edge and/or gray level attributes to generate the image area;
  detecting vertical page edge information of the image area; and
  detecting horizontal page edge information of the image area,
  wherein the vertical and horizontal page edge information define the page size for the pre-scanned image,
  wherein the qualification of the detected edge and/or gray level attributes comprises qualifying an attribute as an image feature corresponding to a particular localized area if at least another localized area adjacent to the particular localized area also includes a qualified image feature.

4. The method of claim 3, wherein the pre-scanned image is apportioned into non-overlapping localized areas.

5. A method of automatically detecting a page size for a digital scanning operation, the method comprising:
  establishing vertical and horizontal limits of an image area containing image content features of a pre-scanned image by analyzing edge and gray level attributes of the pre-scanned image;
  detecting vertical page edge information of the image area;
  detecting horizontal page edge information of the image area,
  wherein the vertical and horizontal page edge information define the page size for the pre-scanned image;
  filtering the image area along a horizontal direction to produce a smoothed image area,
  detecting horizontal edges in the smoothed image area to generate a horizontal edge point map,
  dividing the horizontal edge point map into overlapping horizontal bands; and
  determining whether the edge points in the bands exceed a threshold,
  wherein the vertical page edge information is set to the first band from the bottom that exceeds the threshold and the vertical page edge information is set to the vertical limit of the image area when no band exceeds the threshold.

6. The method of claim 5, wherein the vertical page edge information detection further comprises detecting whether the page is a full width page and setting a full width flag to circumvent the horizontal page edge information detection.

7. A method of scanning a document comprising:
  generating a reduced resolution image of the document;
  establishing vertical and horizontal limits of an image area containing image content features of the reduced resolution image by analyzing edge and gray level attributes, wherein establishing of the image area limits comprises:
    apportioning the reduced resolution image into a plurality of overlapping localized areas,
    detecting edge and gray level attributes for each overlapping localized area, and
    qualifying the detected edge and/or gray level attributes to generate the image area;
  detecting vertical page edge information of the image area;
  detecting horizontal page edge information of the image area;
  scanning the document with a corresponding page size based on the detected vertical and horizontal page edge information.

8. The method of claim 7, wherein the horizontal page edge information detection comprises:
  filtering the image area along a vertical direction to produce a smoothed image area,
  detecting vertical edges in the smoothed image area to generate a vertical edge point map,
  dividing the vertical edge point map into overlapping vertical bands; and
  determining whether the edge points in the bands exceed a threshold,
  wherein the horizontal page edge information is set to the first band from the right that exceeds the threshold and the horizontal page edge information is set to the horizontal limit of the image area when no band exceeds the threshold.

9. A method of scanning a document, comprising:
  generating a reduced resolution image of the document;
  establishing vertical and horizontal limits of an image area containing image content features of the reduced resolution image by analyzing edge and gray level attributes, wherein establishing of the image area limits comprises:
    apportioning the reduced resolution image into a plurality of localized areas,
    detecting edge and gray level attributes for each localized area, and
    qualifying the detected edge and/or gray level attributes to generate the image area;
  detecting vertical page edge information of the image area;
  detecting horizontal page edge information of the image area;
  scanning the document with a corresponding page size based on the detected vertical and horizontal page edge information,
  wherein the qualification of the detected edge and/or gray level attributes comprises qualifying an attribute as an image feature corresponding to a particular localized area if at least another localized area adjacent to the particular localized area also includes a qualified image feature.

10. The method of claim 9, wherein the reduced resolution image is apportioned into non-overlapping localized areas.

11. A method of scanning a document, comprising:
  generating a reduced resolution image of the document;
  establishing vertical and horizontal limits of an image area containing image content features of the reduced resolution image by analyzing edge and gray level attributes;
  detecting vertical page edge information of the image area;

detecting horizontal page edge information of the image area;

scanning the document with a corresponding page size based on the detected vertical and horizontal page edge information;

filtering the image area along a horizontal direction to produce a smoothed image area, detecting horizontal edges in the smoothed image area to generate a horizontal edge point map, dividing the horizontal edge point map into overlapping horizontal bands; and determining whether the edge points in the bands exceed a threshold, wherein the vertical page edge information is set to the first band from the bottom that exceeds the threshold and the vertical page edge information is set to the vertical limit of the image area when no band exceeds the threshold.

12. The method of claim 11, wherein the vertical page edge information detection further comprises detecting whether the page is a full width page and setting a full width flag to circumvent the horizontal page edge information detection.

* * * * *